Dec. 2, 1941. F. J. TOBIAS Re. 21,967

PROCESS AND APPARATUS FOR HANDLING ELASTIC FILAMENTS

Original Filed Aug. 14, 1937

INVENTOR
FRED J. TOBIAS

BY Mock & Blum
ATTORNEYS

Reissued Dec. 2, 1941 Re. 21,967

UNITED STATES PATENT OFFICE 21,967

PROCESS AND APPARATUS FOR HANDLING ELASTIC FILAMENTS

Fred J. Tobias, Ridgewood, N. Y., assignor to Filatex Corporation, Trenton, N. J., a corporation of New Jersey Original No. 2,199,550, dated May 7, 1940, Serial No. 159,051, August 14, 1937. Application for reissue May 5, 1941, Serial No. 392,011

14 Claims. (Cl. 242—45)

The invention relates in general to the handling of elastic filamentary bodies and in particular to a process of rewinding covered and uncovered elastic rubber yarns and threads and to correlated improvements designed to enhance the properties and usefulness of such yarns and threads.

In the heretofore practiced methods of manufacturing and handling packages of rubber like elastic filamentary bodies such as bare rubber filaments and filaments in the form of covered elastic yarns, non-uniformity in tension throughout a given length of such filamentary bodies has invariably resulted. Such non-uniformity of tension of the packages has given rise to many serious difficulties both in the covering of rubber filaments and in the fabrication of various structures from the resultant covered yarns. In the process of producing elastic yarns comprising a rubber core and a covering of textile thread, the rubber core is usually passed through the covering machine in a stretched condition, the degree of stretch being initially adjusted before starting of the machine. Due to the non-uniform tension in the rubber filaments introduced into the covering machine, the degree of stretch is automatically varied, thus yielding a non-uniform covered elastic yarn.

In the winding and rewinding of covered elastic yarns according to the hitherto known practices, the yarn has been transferred from one package to another under tension and with a relatively short span between the packages so that any non-uniformity in tension present in the yarn of the first package was maintained and transmitted by the yarn into the second package. This non-uniformity in tension within the yarn package gave rise to serious difficulties in knitting and weaving operations as the structure produced was characterized by having portions under greater tension than other portions which tended to yield a wavy fabric which would not lie flat.

In the winding up and rewinding of covered elastic yarns, it has been customary to wind the yarn into a package on a revolving supporting core such, for example, as a spool, cop, cone, bottle or the like, by withdrawing the yarn over one end of a supply spool, cop, bottle or the like, held in a stationary position. During such a rewinding process, a twist is imparted to the yarn on the newly formed package which cannot be eliminated except by twisting the yarn in the opposite direction. A yarn having such a twist is known in the art as an "off-balanced" yarn, the condition of which does not change during subsequent rewinding operations. In the weaving and knitting of fabrics, "off-balanced" elastic yarns have proved to be useless as the kinks and knots which develop in the yarn catch in the knitting needles or shuttles causing breaks and producing unsightly spots in the fabric.

The general object of the invention is to obviate the foregoing and other disadvantages.

Another object of the invention is to provide a process for producing a yarn package in which the yarn is balanced and under substantially uniform longitudinal tension.

A specific object is to provide a process whereby the tension in a rubber filament is continuously and consistently removed prior to passing the filament for use.

An additional object of the invention is to provide a process and an apparatus for eliminating the usual "off-balance" developed in a covered elastic yarn during rewinding.

Other objects of the invention will in part be obvious and will in part appear hereinafter.

According to the invention, a balanced elastic yarn package is produced by continuously unwinding an elastic yarn from a yarn package in which the yarn is wound under more or less tension, relaxing the yarn and rewinding the relaxed yarn under a uniform tension into a second yarn package. The expression yarn as used in the specification and claims is intended to include one or more filaments, strands, threads and like filamentary bodies.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawing in which.

Figure 1:
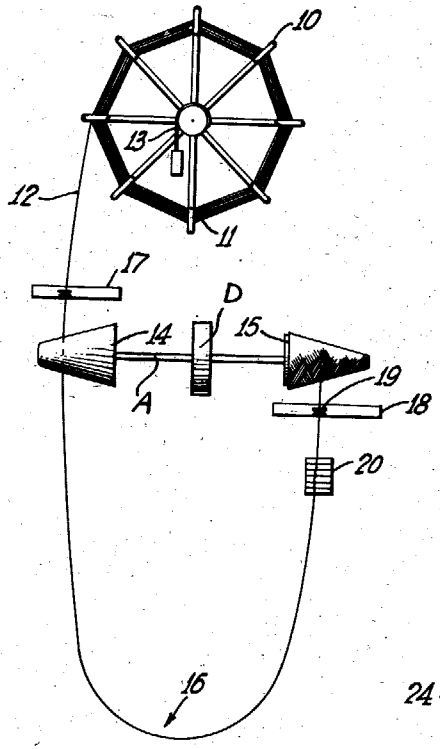
Fig. 1 is a diagrammatic view in side elevation of one embodiment of the apparatus of the invention.

In order to produce a package of balanced yarn, according to the invention as depicted in Fig. 1, a swift 10 carrying the yarn 12 in the form of a package, is rotatably mounted upon a suitable support and provided with a braking means 13. The yarn is withdrawn from the package winding and advanced by suitable means such as cooperating drawing rollers 14—14 and later used as by being formed into a second yarn package by winding upon a core 15, such as a cop, bottle, cone, bobbin or the like when other use, such as fabrication of various structures as previously mentioned, is to be deferred until some later time. A free hanging loop 16 is maintained in the filament between the withdrawing means and the point of use. The yarn in the loop 16 relaxes and, since the weight of the yarn is negligible, it is in an untensioned condition throughout the zone formed by the loop. Relaxation of the yarn takes place without any tendency on the part of the yarn to twist. Since the rotating speed of the cop 15 normally remains constant the size of the loop 16 tends to decrease due to the gradual increase in the diameter of the second yarn package during rewinding. This effect may be prevented by employing for the withdrawing means a pair of conical rollers provided with a cooperating guide 17 which is caused during operation to move the thread from the small end to the large end of the drawing rollers, thus gradually increasing the feeding speed of the yarn to compensate for the increased rewinding rate. With this latter arrangement it is obvious that the drawing and winding speeds may be correlated to maintain the size of the loop 16 substantially constant or within certain suitable limits during operation. The traverse means 18 may be provided with suitable guide means 19 for delivering the yarn to the core 15, the tensioning device 20 being employed to restrict the advance of the yarn and thereby control the winding tension.

One of the unwinding rollers 14—14 and the rewind-support for the core 15 may be mounted upon the same shaft A and thus be driven by a common drive wheel D. Preferably the unwinding and rewinding means are mounted upon separate shafts and are independently driven but it is to be understood that the unwinding and rewinding means are in simultaneous operation and co-function to produce the balanced yarn package of the invention.

Figure 2:
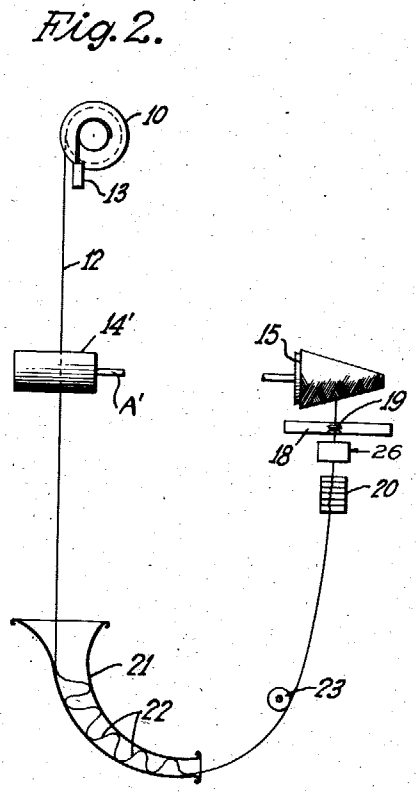
Fig. 2 is a diagrammatic view illustrating another embodiment of the apparatus of the invention.

Another embodiment of the apparatus of the invention is shown in Fig. 2 wherein a yarn package on a support, for example, in the form of a bobbin, cop or spool 10 provided with braking means 13 is rotatably mounted so that the yarn 12 may be withdrawn therefrom by means of cooperating drawing rollers 14'—14'. The yarn 12 is delivered in a relaxed state to a receptacle 21 which is preferably in the form of a tapering tube. The yarn is caused to fall freely within the receptacle to form a plurality of folds or loops 22. The relaxed yarn is withdrawn from the other end of the tube around a guide rod or roller 23 and formed into a yarn package by winding upon a core 15 such, for example, as a cop, spool, bottle or the like having a suitable guide means 18 cooperating therewith.

The uniform tension under which the yarn is wound upon the core 15 may be controlled by a suitable guiding or tensioning means 19 mounted on the guide means and/or by tensioning means 20. The drawing rollers 14'—14' may be of the type shown in Fig. 3, or they may be cylindrical, in which case suitable means (not shown) of known design may be provided to gradually increase their peripheral speed during operation to compensate for the increased rate of rewinding. Alternatively a sufficient supply of yarn may be maintained in the receptacle 21 to compensate for the differences in the rates of feeding and winding.

Figure 3:
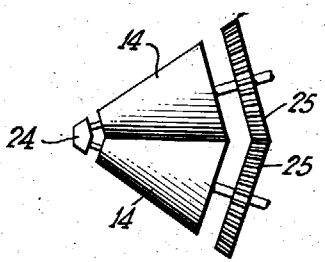
Fig. 3 shows in an enlarged top view, the drawing rollers shown in Fig. 1.

In Fig. 3 there is shown a top view of a pair of conical drawing rollers 14—14 which are journaled at their small ends in a double bearing 24. At their large ends, the rollers 14—14 are provided with bevel gears 25—25 which intermesh with each other, one of which may be driven by suitable means (not shown).

While the invention has been described broadly with respect to the rewinding of a yarn package, it is within the purview of the invention to carry out a suitable operation between the first and second yarn packages, for example, the operation of covering a rubber core. A conventional covering unit may be interposed in the apparatus shown at any suitable point in the right hand arm of the U-shaped loop. Such a covering unit has been diagrammatically illustrated at 26 and will usually comprise one or more rotatable spindles for applying a suitable covering to the core. In such an arrangement, the rubber filament will be continuously supplied to the covering machine while in a uniform state of tension throughout.

While only single units of the apparatus of the invention have been shown, it is contemplated to provide apparatus composed of a plurality of units disposed adjacent one another whereby the various operating elements may derive their motive power from a common source.

The elastic yarn in the package obtained by the winding process of the invention is characterized by being substantially completely balanced throughout its length as to tension and twist and is therefore admirably suited for direct use in the fabrication of textile material without the necessity of rewinding, balancing or otherwise conditioning the yarn.

Since certain changes in carrying out the above process and in the constructions set forth, which embody the invention, may be made without departing from its scope, it is intended that all matter contained in the above description or shown in the accompanying drawing shall be interpreted as illustrative and not in a limiting sense.

I claim:

1. A process of rewinding rubber-like elastic yarn which comprises unwinding a tensioned rubber-like elastic yarn from a package thereof, delivering the yarn to a receptacle in which it is permitted to assume a relaxed state, withdrawing the yarn and rewinding the relaxed yarn under a uniform tension to form a package of balanced yarn.

2. A process of rewinding rubber-like elastic yarn which comprises continuously unwinding a tensioned rubber-like elastic yarn from a package thereof, delivering the yarn to one end of a receptacle in which it is permitted to assume a relaxed state, continuously withdrawing yarn from the opposite end of the receptacle and rewinding the relaxed yarn under uniform tension.

3. Apparatus for handling covered rubber-like elastic yarn which comprises positively driven means for continuously unwinding tensioned elastic yarn from a package thereof, means for winding the yarn into a package, means for maintaining a freely suspended loop of yarn between the packages and means for correlating the speed of the unwinding and winding means to maintain the size of the loop within predetermined limits during operation of the apparatus.

4. Apparatus for handling covered rubber-like elastic yarn which comprises, in combination a receptacle, means for unwinding tensioned elastic yarn from a package and for continuously delivering the yarn to the receptacle in which it is permitted to assume a relaxed state, means for continuously withdrawing the yarn from the receptacle and for winding it into a package of substantially uniformly tensioned yarn.

5. A method of winding a rubber-like elastic filamentary body in final package form, which consists in unwinding the elastic filamentary body under tension from a previously formed package, maintaining a zone of said elastic filamentary body between said previously formed package and the final package and also continuously maintaining said elastic filamentary body substantially relaxed in said zone, and continuously feeding said elastic filamentary body from said zone to said final package under a substantially uniform tension.

6. A process of handling rubber-like elastic filaments which comprises removing a tensioned rubber-like elastic filament from its support, passing the filament so removed through a zone in which it is permitted to assume a substantially relaxed condition, passing the filament from said zone and subjecting it to a tensioning operation, and winding the filament while under tension.

7. A process of handling rubber-like elastic filaments which comprises removing a tensioned rubber-like elastic filament from its support, passing the filament so removed through a zone in which it is permitted to assume a substantially relaxed condition, passing the filament from said zone and subjecting it to a tensioning operation, applying a covering to the filament while under tension, and winding the covered filament.

8. An apparatus for handling rubber-like elastic filaments comprising means for supporting a winding of tensioned rubber-like elastic filament, positively driven means for removing the filament from the winding, means for rewinding the filament, and means for restricting the advance of the filament to the rewinding means so as to substantially uniformly tension the filament during rewinding, the speed of operation of the means for removing the filament from the winding and the speed of operation of the rewinding means being so correlated as to form a suspended loop in which the filament exists in a substantially relaxed condition ahead of the means for restricting the advance of the filament.

9. An apparatus for handling rubber-like elastic filaments comprising means for supporting a winding of tensioned rubber-like elastic filament, positively driven means for removing the filament from the winding, means for tensioning and advancing the filament, the speeds of operation of the means for removing the filament from the winding and the means for tensioning and advancing the filament being so correlated that a freely suspended loop, in which the filament exists in a substantially relaxed condition, is maintained in advance of the filament tensioning means, and means for applying a covering to the filament while it is maintained under tension.

10. A process for handling rubber-like elastic filaments which comprises removing a tensioned rubber-like elastic filament from its support, passing the filament so removed through a zone in which it is consistently permitted to assume a substantially relaxed condition, passing the filament from said zone in a substantially uniform state of tension, and winding the filament while so tensioned.

11. A process for handling rubber-like elastic filaments which comprises unwinding a tensioned rubber-like elastic filament from its support, passing the filament so removed through a zone within which the filament at all times of operation is permitted to assume a substantially untensioned condition, passing the filament from said zone and thereafter tensioning the filament, and utilizing the filament while it is tensioned.

12. A process for handling rubber-like elastic filaments which comprises unwinding a rubber-like elastic filament from its support, passing the filament so removed through a zone within which the filament at all times of operation is permitted to assume an unstretched condition, and passing the filament from said zone to a point of use.

13. A process of handling rubber-like elastic filaments which comprises removing a tensioned rubber-like elastic filament from its support, passing the filament so removed through a zone in which it is caused to assume a substantially untensioned condition, passing the filament from said zone and subjecting it to a tensioning operation, applying a covering to the filament while under tension, and winding the covered filament.

14. An apparatus for handling rubber-like elastic filaments comprising means for supporting a winding of tensioned rubber-like elastic filament, positively driven means for removing the filament from the winding, means for tensioning and advancing the filament, the speeds of operation of the means for removing the filament from the winding and the means for tensioning and advancing the filament being so correlated that a suspended loop, in which the filament exists in a substantially untensioned condition, is maintained in advance of the filament tensioning means, and means for applying a covering to the filament while it is maintained under tension.

FRED J. TOBIAS.